United States Patent
Kim et al.

(10) Patent No.: US 11,334,747 B2
(45) Date of Patent: May 17, 2022

(54) AUGMENTED REALITY (AR) DEVICE AND METHOD OF PREDICTING POSE THEREIN

(71) Applicants: SAMSUNG ELECTRONICS CO., LTD., Suwon-si (KR); Korea University Research and Business Foundation, Seoul (KR)

(72) Inventors: Yuntae Kim, Seoul (KR); Sanghoon Sull, Seoul (KR); Geeyoung Sung, Daegu (KR); Hongseok Lee, Seoul (KR); Myungjae Jeon, Yongin-si (KR)

(73) Assignees: SAMSUNG ELECTRONICS CO., LTD., Suwon-si (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/037,102

(22) Filed: Sep. 29, 2020

(65) Prior Publication Data
US 2021/0326584 A1 Oct. 21, 2021

(30) Foreign Application Priority Data
Apr. 16, 2020 (KR) .................. 10-2020-0046268

(51) Int. Cl.
*G06K 9/00* (2022.01)
*G06F 3/01* (2006.01)
(Continued)

(52) U.S. Cl.
CPC ......... *G06K 9/00335* (2013.01); *G06F 3/017* (2013.01); *G06N 3/049* (2013.01); *G06T 19/006* (2013.01)

(58) Field of Classification Search
CPC combination set(s) only.
See application file for complete search history.

(56) References Cited

U.S. PATENT DOCUMENTS

2018/0165831 A1 6/2018 Kwant et al.
2019/0005670 A1 1/2019 DeTone et al.
(Continued)

FOREIGN PATENT DOCUMENTS

KR 10-2018-0111224 A 10/2018
WO 2018039269 A1 3/2018
WO 2019153245 A1 8/2019

OTHER PUBLICATIONS

T. Qin, P. Li and S. Shen, "VINS-Mono: A Robust and Versatile Monocular Visual-Inertial State Estimator," in IEEE Transactions on Robotics, vol. 34, No. 4, pp. 1004-1020, Aug. 2018, doi: 10.1109/TRO.2018.2853729 (Year: 2018).*
(Continued)

*Primary Examiner* — Motilewa Good-Johnson
(74) *Attorney, Agent, or Firm* — Sughrue Mion, PLLC

(57) ABSTRACT

An augmented reality (AR) device and a method of predicting a pose in the AR device is provided. In the augmented reality (AR) device inertial measurement unit (IMU) values corresponding to the movement of the AR device are obtained at an IMU rate, intermediate 6-degrees of freedom (6D) poses of the AR device are estimated based on the IMU values and images around the AR device via a visual-inertial simultaneous localization and mapping (VI-SLAM) module, and a pose prediction model for predicting relative 6D poses of the AR device is generated by performing learning by using a deep neural network.

22 Claims, 15 Drawing Sheets

(51) Int. Cl.
*G06N 3/04* (2006.01)
*G06T 19/00* (2011.01)

(56) References Cited

U.S. PATENT DOCUMENTS

| | | | |
|---|---|---|---|
| 2019/0164040 A1 | 5/2019 | Naroditsky et al. | |
| 2019/0371024 A1 | 12/2019 | Wisely Babu et al. | |
| 2020/0272148 A1* | 8/2020 | Karasev | G05D 1/0088 |
| 2020/0334461 A1 | 10/2020 | Rabinovich et al. | |
| 2020/0364901 A1* | 11/2020 | Choudhuri | G02B 27/0179 |
| 2021/0044792 A1* | 2/2021 | Taylor | H04N 5/06 |
| 2021/0248358 A1* | 8/2021 | Lee | G06K 9/00355 |

OTHER PUBLICATIONS

Alatise, Mary B., and Gerhard P. Hancke 2017. "Pose Estimation of a Mobile Robot Based on Fusion of IMU Data and Vision Data Using an Extended Kalman Filter" Sensors 17, No. 10: 2164 (Year: 2017).*
Shamwell et al., "Unsupervised Deep Visual-Inertial Odometry with Online Error Correction for RGB-D Imagery," IEEE Transactions on Pattern Analysis and Machine Intelligence, vol. 42, No. 10, Apr. 15, 2019, DOI: 10.1109/TPAMI.2019.2909895, 16 pages.
Communication dated Jan. 14, 2021 by the European Patent Office in European Application No. 20208271.5.
Bill Triggs et al., "Bundle Adjustment—A Modern Synthesis" HAL Archives, retrieved from https://hal.inria.fr/inria-00548290, Dec. 20, 2010, (72 pages total).
G. Klein et al., "Parallel Tracking and Mapping for Small AR Workspaces," 2007 6th IEEE and ACM International Symposium on Mixed and Augmented Reality, 2007, pp. 225-234.
Gabe Sibley et al., "Sliding Window Filter with Application to Planetary Landing" Journal of Field Robotics, vol. 27, No. 5, 2010, (pp. 587-608).
Stefan Leutenegger et al., "Keyframe-based visual-inertial odometry using nonlinear optimization" The International Journal of Robotics Research, 2014, (21 pages total).
Raúl Mur-Artal et al., "ORB-SLAM: A Versatile and Accurate Monocular SLAM System" IEEE Transactions on Robotics, 2015, (17 pages total).
Thomas Whelan et al., "ElasticFusion: Dense SLAM Without a Pose Graph" Research Gate, Jul. 2015 (9 pages total).
Christian Forster et al., On-Manifold Preintegration for Real-Time Visual-Inertial Odometry Cornell University, retrieved from https://arxiv.org/abs/1512.02363, 2015, (20 pages total).
Raúl Mur-Artal et al., "ORB-SLAM2: An Open-Source SLAM System for Monocular, Stereo, and RGB-D Cameras" IEEE Transactions on Robotics, Short Papers, 2017, (8 pages total).
Haomin Liu et al., ICE-BA: Incremental, Consistent and Efficient Bundle Adjustment for Visual-Inertial SLAM IEEE, retrieved from https://github.com/baidu/ICE-BA, 2018, (9 pages total).
Thomas Schöps et al., "BAD SLAM: Bundle Adjusted Direct RGB-D SLAM" IEEE/CVF Conference on Computer Vision and Pattern Recognition (CVPR), 2019, (9 pages total).
Ronald Clark et al,. "VINet: Visual-Inertial Odometry as a Sequence-to-Sequence Learning Problem" retrived from illusarXiv: 1701. 08376v2 [cs.CV], Apr. 2, 2017, (7 pages total).
Jan Koutník et al., "A Clockwork RNN" retrieved from arXiv:1402. 3511v1 [cs.NE], Feb. 14, 2014, (9 pages total).
Linchao Zhu et al., "Bidirectional Multirate Reconstruction for Temporal Modeling in Videos" IEEE Conference on Computer Vision and Pattern Recognition, 2017, (10 pages total).
Changhao Chen et al., "IONet: Learning to Cure the Curse of Drift in Inertial Odometry" University of Oxford Department of Computer Science, Jan. 29, 2019, (13 pages total).

* cited by examiner

AUGMENTED REALITY (AR) DEVICE AND METHOD OF PREDICTING POSE THEREIN

CROSS-REFERENCE TO RELATED APPLICATION

This application claims priority to Korean Patent Application No. 10-2020-0046268, filed on Apr. 16, 2020, in the Korean Intellectual Property Office, the disclosure of which is incorporated herein in its entirety by reference.

BACKGROUND

1. Field

Example embodiments of the disclosure relate to an augmented reality (AR) device and a method of predicting a pose in the AR device.

2. Description of Related Art

With the recent technological developments, various types of wearable devices that can be worn on the human body have been developed. A glasses-type wearable device is worn on a head of a user and may provide an augmented reality service to the user by displaying visual information about a virtual object on a display of the device.

According to display technologies such as augmented reality (AR) technology, an image output on a device may be perceived by a user as being real. Accordingly, a user may experience situations that cannot be encountered in the real life as being real through AR technology display device or the like. In order to facilitate this experience, it is important that an output image is provided to a user through an AR device in real-time. Moreover, the output image has to be closely related to the pose of a wearable device worn on the user, and therefore accurate detection of a user's pose is required. When an output image is not displayed in real time, a user may feel uncomfortable due to an error caused by a difference between a detected pose and the output image. Accordingly, accurate pose prediction methods using various digital processing technologies such as computer vision or simultaneous localization and mapping (SLAM) are needed.

SUMMARY

Provided is an augmented reality (AR) device and a method of predicting a pose in the AR device. The technical objectives to be achieved by the disclosure are not limited to the above-described objectives, and other technical objectives may be inferred from the following embodiments.

Additional aspects will be set forth in part in the description which follows and, in part, will be apparent from the description, or may be learned by practice of the presented embodiments of the disclosure.

According to an aspect of the disclosure, there is provided a method of predicting a pose in an augmented reality (AR) device, the method comprising: obtaining, using an inertial measurement unit (IMU) sensor provided in the AR device, IMU values corresponding to a movement of the AR device at an IMU rate of a first frequency; estimating intermediate 6-degrees of freedom (6D) poses of the AR device based on the obtained IMU values and images surrounding the AR device, the images being obtained at a frame rate of a second frequency by a camera provided in the AR device; and generating, by a processor, a pose prediction model for predicting relative 6D poses of the AR device by performing learning based on the obtained IMU values and the intermediate 6D poses using a deep neural network.

According to another aspect of the disclosure, there is provided a non-transitory computer readable recording medium having recorded thereon a program for executing, in a computer, a method of predicting a pose in an augmented reality (AR) device, the method comprising: obtaining, using an inertial measurement unit (IMU) sensor provided in the AR device, IMU values corresponding to a movement of the AR device at an IMU rate of a first frequency; estimating intermediate 6-degrees of freedom (6D) poses of the AR device based on the obtained IMU values and images surrounding the AR device, the images being obtained at a frame rate of a second frequency by a camera provided in the AR device; and generating, by a processor, a pose prediction model for predicting relative 6D poses of the AR device by performing learning based on the obtained IMU values and the intermediate 6D poses using a deep neural network.

According to another aspect of the disclosure, there is provided an augmented reality (AR) device comprising: an inertial measurement unit (IMU) sensor configured to obtain IMU values corresponding to a movement of the AR device at an IMU rate of a first frequency; a camera configured to obtain images surrounding the AR device at a frame rate of a second frequency; a visual-inertial simultaneous localization and mapping (VI-SLAM) module configured to estimate intermediate 6-degrees of freedom (6D) poses of the AR device based on the obtained IMU values and the images surrounding the AR device; and a processor configured to generate a pose prediction model for predicting relative 6D poses of the AR device by performing learning based on the obtained IMU values and the intermediate 6D poses using a deep neural network.

According to another aspect of the disclosure, there is provided a method of predicting a pose in a processor, the method comprising: obtaining, by using an inertial measurement unit (IMU) sensor provided in an augmented reality (AR) device, IMU values corresponding to a movement of the AR device at an IMU rate of a first frequency; obtaining intermediate 6-degrees of freedom (6D) poses of the AR device estimated based on the obtained IMU values and images surrounding the AR device, the images being obtained at a frame rate of a second frequency using a camera provided in the AR device; and generating a pose prediction model for predicting relative 6D poses of the AR device by performing learning based on the obtained IMU values and the intermediate 6D poses using a deep neural network.

According to another aspect of the disclosure, there is provided a computer-implemented method of training a neural network for pose prediction comprising: collecting inertial measurement unit (IMU) values corresponding to a movement of an augmented reality (AR) device, the IMU values being collected at a first frequency; collecting images surrounding the AR device, the images collected at a second frequency; performing one or more operations on the collected IMU values and the collected images to create intermediate 6-degrees of freedom (6D) poses of the AR device; and training the neural network based on the collected IMU values and the intermediate 6D poses.

According to another aspect of the disclosure, there is provided an apparatus for training a neural network for pose prediction comprising: a memory storing one or more instructions; and a processor configured to execute the one or more instructions to: collect inertial measurement unit (IMU) values corresponding to a movement of an augmented reality (AR) device, the IMU values being collected at a first frequency; collect images surrounding the AR device, the images collected at a second frequency; perform one or more operations on the collected IMU values and the collected images to create intermediate 6-degrees of freedom (6D) poses of the AR device; and train the neural network based on the collected IMU values and the intermediate 6D poses.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
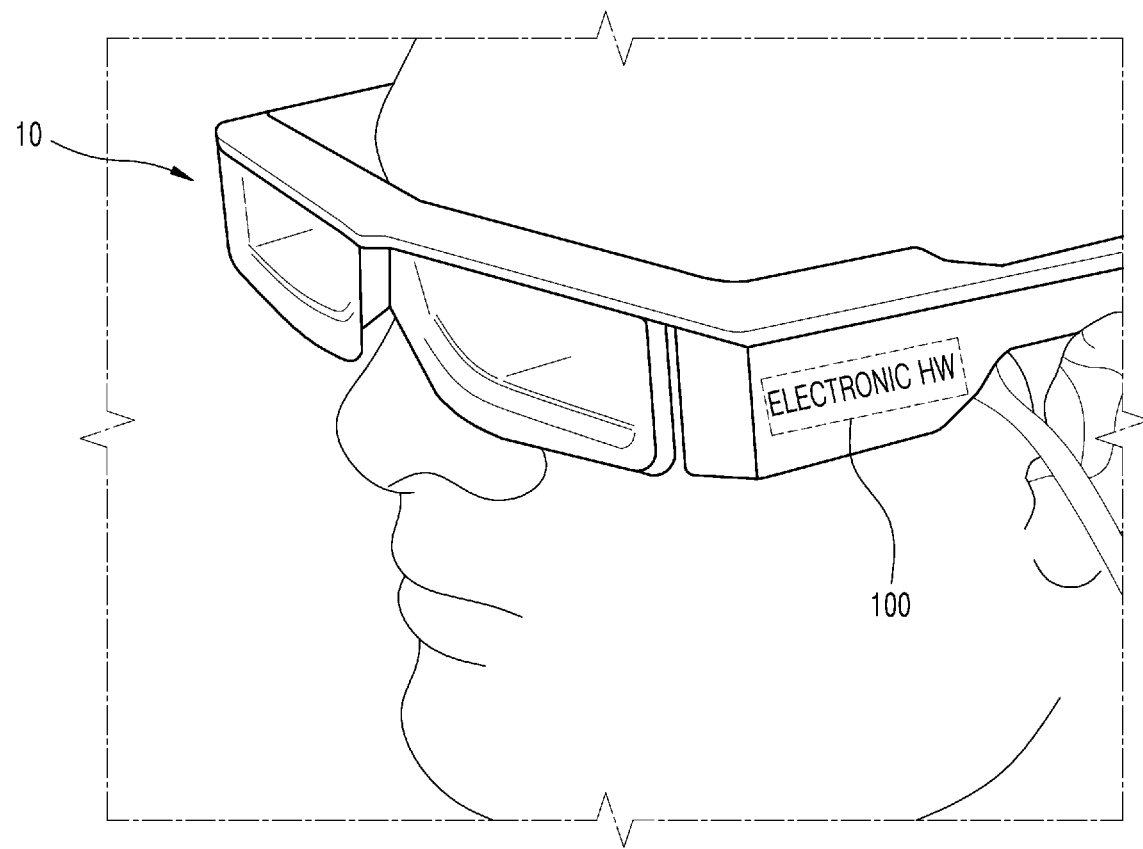
FIG. 1 illustrates an augmented reality (AR) device according to an example embodiment.

Reference will now be made in detail to embodiments, examples of which are illustrated in the accompanying drawings, wherein like reference numerals refer to like elements throughout. In this regard, the some example embodiments may have different forms and should not be construed as being limited to the descriptions set forth herein. Accordingly, the example embodiments are described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the example embodiments have been selected from currently widely used general terms in consideration of the functions in the disclosure. However, the terms may vary according to the intention of one of ordinary skill in the art, case precedents, and the advent of new technologies. Furthermore, for special cases, meanings of the terms selected by the applicant are described in detail in the description section. Accordingly, the terms used in the disclosure are defined based on their meanings in relation to the contents discussed throughout the specification, not by their simple meanings.

In the example embodiments, while such terms as "first," "second," etc., may be used to describe various components, such components must not be limited to the above terms. The above terms are used only to distinguish one component from another.

The terms used in some embodiments are merely used to describe example embodiments, and are not intended to limit the disclosure. An expression used in the singular encompasses the expression of the plural, unless it has a clearly different meaning in the context. Furthermore, in the example embodiments, when a constituent element "connects" or is "connected" to another constituent element, the constituent element contacts or is connected to the other constituent element not only directly, but also electrically through at least one of other constituent elements interposed therebetween. When a part may "include" a certain constituent element, unless specified otherwise, it may not be construed to exclude another constituent element but may be construed to further include other constituent elements.

The "above" and similar directives used in relation to the example embodiments, in particular, in claims, may refer to both singular and plural. Furthermore, the operations or steps of all methods according to the example embodiments described herein can be performed in any suitable order unless otherwise indicated herein or otherwise clearly contradicted by context. The example embodiments are not limited to the description order of the described operations or steps.

The disclosure may be described in terms of functional block components and various processing steps. Such functional blocks may be realized by any number of hardware and/or software components configured to perform the specified functions. For example, the functional blocks related to the example embodiments may be implemented by one or more microprocessors or by circuit elements for certain functions. Furthermore, the function blocks may be implemented with various programming or scripting languages. Furthermore, the functional blocks may be implemented in algorithms that are executed on one or more processors. The example embodiments could employ any number of related art techniques for electronics configuration, signal processing and/or control, data processing and the like.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The example embodiments of the disclosure are described below in detail with reference to the accompanying drawings. However, the example embodiments are not limited thereto and it will be understood that various changes in form and details may be made therein without departing from the spirit and scope of the following claims.

FIG. 1 illustrates an augmented reality (AR) 10 device according to an example embodiment.

Referring to FIG. 1, the AR device 10 may be a wearable electronic device that is worn by a user. For example, the AR device 10 may be a glasses type wearable device, but embodiments are not limited thereto. For example, according to another example embodiment, the AR device 10 may be a wearable device of a different type to be worn on other human body part of a user, for example, an AR helmet.

The AR device 10 may provide, through a display on the AR device 10, an AR service that fuses real world information around a user and digital or virtual object information. For example, when an AR object (or AR scene) is displayed on the eyes of a user through the AR device 10, the AR object may be displayed together with a scene of the real world seen at a current pose of the AR device 10. According to an example embodiment, the AR object may be displayed, overlaid or superimposed on the scene of the real world environment perceived by a user at a current pose of the AR device 10. While the user may see the AR object through the AR device 10, the AR object does not exist in the real world.

The real world is a real scene that may be seen by an observer or a user through the AR device 10, and may include a real world object. On the other hand, the AR object (or scene) is an image generated by graphics processing and may correspond to a static image or a dynamic image. For example, the AR object (or scene) may be an image that is overlaid on a real scene to provide information about a real object in the real scene, or information or a control menu regarding the operation of the AR device 10.

The AR device 10 may correspond to a head-mounted wearable device, as illustrated in FIG. 1, and accordingly may move together when the head of a user moves. Thus, as the pose of the AR device 10 may be continuously changed depending on the movement of the head of a user, it is necessary that the pose of the AR device 10 is continuously updated considering a change in the pose of the head of a user. For example, when a user wearing the AR device 10 walks on the road, a real world scene seen through the AR device 10 is continuously changing. Accordingly, the AR object (or AR scene) provided by the AR device 10 may be re-rendered considering a current pose so that a seamless perspective that the AR object (or AR scene) is present on the real world scene is provided to a user.

According to an example embodiment, the AR device 10 may be provided with electronic hardware (HW) 100 including various types of sensing modules such as an inertial measurement unit (IMU) sensor, a simultaneous localization and mapping (SLAM) module, an accelerometer, or a compass, an image capture module such as a camera, a microphone, a GPS module, a communication interface, a processing unit, or a battery. According to an example embodiment, the electronic HW may be provided in a partial inner space of the AR device 10. The AR device 10 may be further provided with an optical engine or an optical element to display the AR object. Although, for convenience of explanation, FIG. 1 illustrates that the electronic HW 100 is provided in a frame at one side of the AR device 10, the location of the electronic HW 100 in the AR device 10 is not limited thereto and the electronic HW 100 may be provided at various locations on the AR device 10 and each of hardware constituent elements may be provided in the same space or in different spaces.

Figure 2:
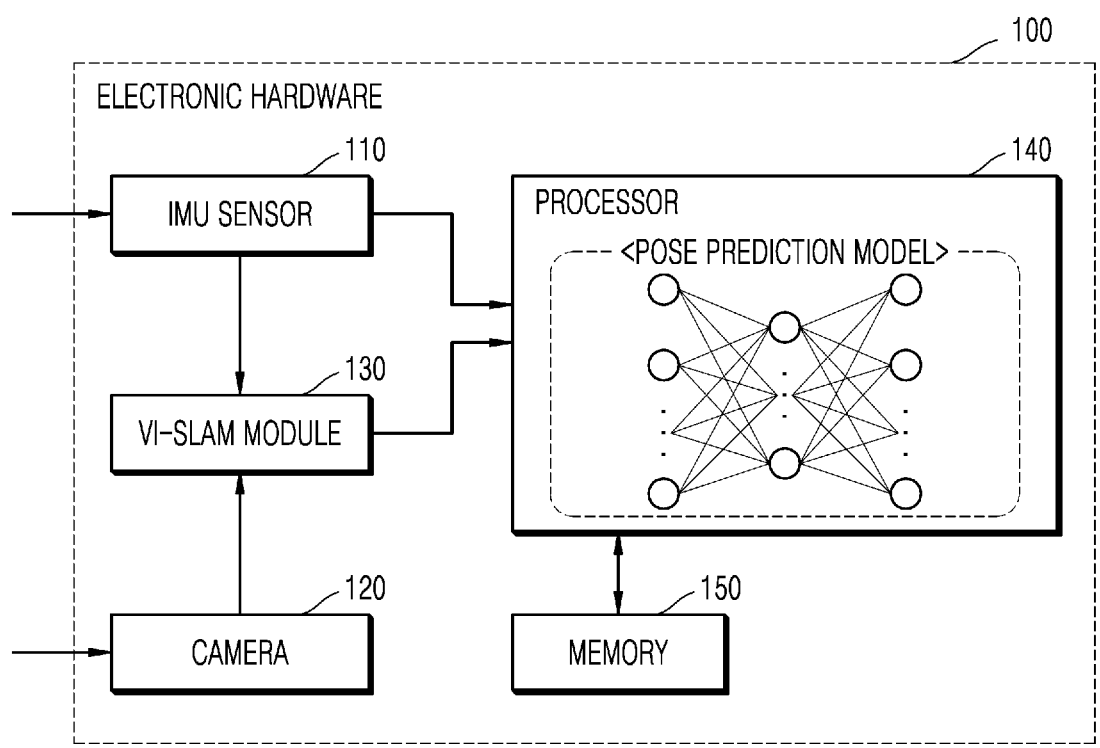
FIG. 2 is a block diagram of electronic hardware provided in the AR device according to an example embodiment.

FIG. 2 is a block diagram of electronic hardware provided in the AR device according to an embodiment.

Referring to FIG. 2, the electronic HW 100 may include an IMU sensor 110, a camera 120, a visual-inertial simultaneous localization and mapping (VI-SLAM) module 130, a processor 140, and a memory 150. In the electronic HW 100 of FIG. 2, hardware constituent elements related to an embodiment of performing pose prediction are mainly illustrated for convenience of explanation. However, the electronic HW 100 may further include other hardware constituent elements such as a microphone, a global positioning system (GPS) module, a communication interface, or an optical engine, or other general-purpose constituent elements according to some example embodiments.

The IMU sensor 110 is a sensor for measuring speed, direction, gravity, or acceleration of the AR device 10. The IMU sensor 110 may measure a free movement of the AR device 10 in a three-dimensional (3D) space by using a gyroscope, an accelerometer, or a geomagnetic field so that acceleration in a proceeding direction, a lateral direction, and a height direction, and rolling, pitching, and yaw angular velocity may be measured. Calculation of a speed, a relative location, or a pose angle of the AR device 10 may be possible by integrating the acceleration and angular velocity obtained from the IMU sensor 110.

The IMU sensor 110 may obtain IMU values corresponding to the movement of the AR device 10 of FIG. 1 at a frame rate (i.e., an IMU rate) of a first frequency. In other words, temporal sequence of the IMU values may be obtained from the IMU sensor 110.

Figure 3:
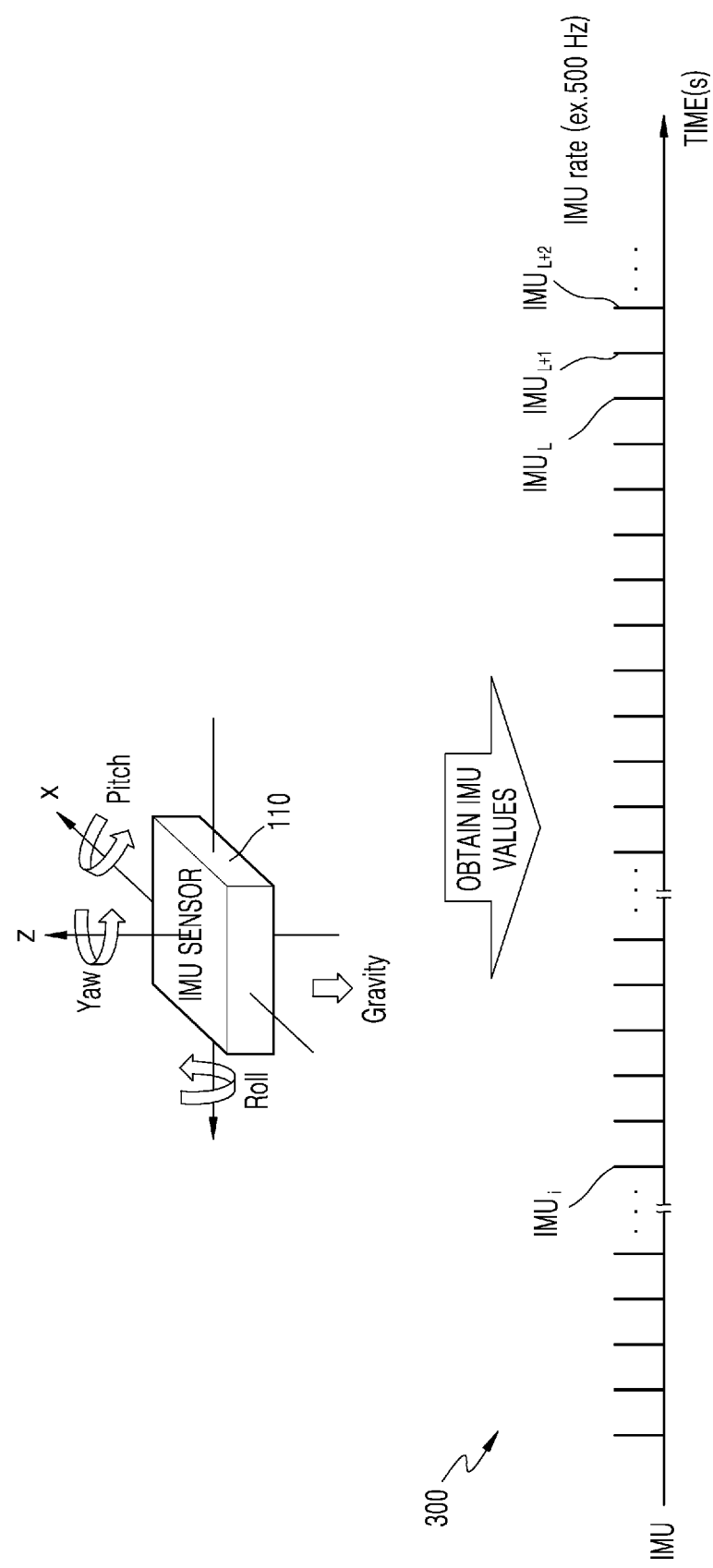
FIG. 3 is a timing diagram of time points for obtaining inertial measurement unit (IMU) values via an IMU sensor according to an example embodiment.

FIG. 3 is a timing diagram of time points for obtaining IMU values via an IMU sensor according to an example embodiment. Referring to FIG. 3, the IMU sensor 110 may measure, at the IMU rate of a first frequency, acceleration in a proceeding direction (X axis), a lateral direction (Y axis), and a height direction (Z axis) and roll, pitch, and yaw angular velocity, and output the measured IMU values. According to an example embodiment, the IMU rate may be 500 MHZ, but embodiments are not limited thereto. In a timing diagram 300 of FIG. 3, each of vertical bars denotes a time point when the IMU values are obtained. For example, an IMU value obtained at a time point I may be expressed as $IMU_i$, ..., an IMU value obtained at a time point L may be expressed as $IMU_L$, an IMU value obtained at a time point L+1 may be expressed as $IMU_{L+1}$, and an IMU value obtained at a time point L+2 may be expressed as $IMU_{L+2}$, where i and L are natural numbers.

Referring back to FIG. 2, the camera 120 is an image capture device for photographing a real scene of an environment surrounding the AR device 10. For instance, the camera 120 may be a front facing camera configured to capture the surrounding in front of the AR device 10. The camera 120 obtains images around the AR device 10 at a frame rate of a second frequency. In other words, temporal sequence of images of the real scene around the AR device 10 may be obtained from the camera 120.

Figure 4:
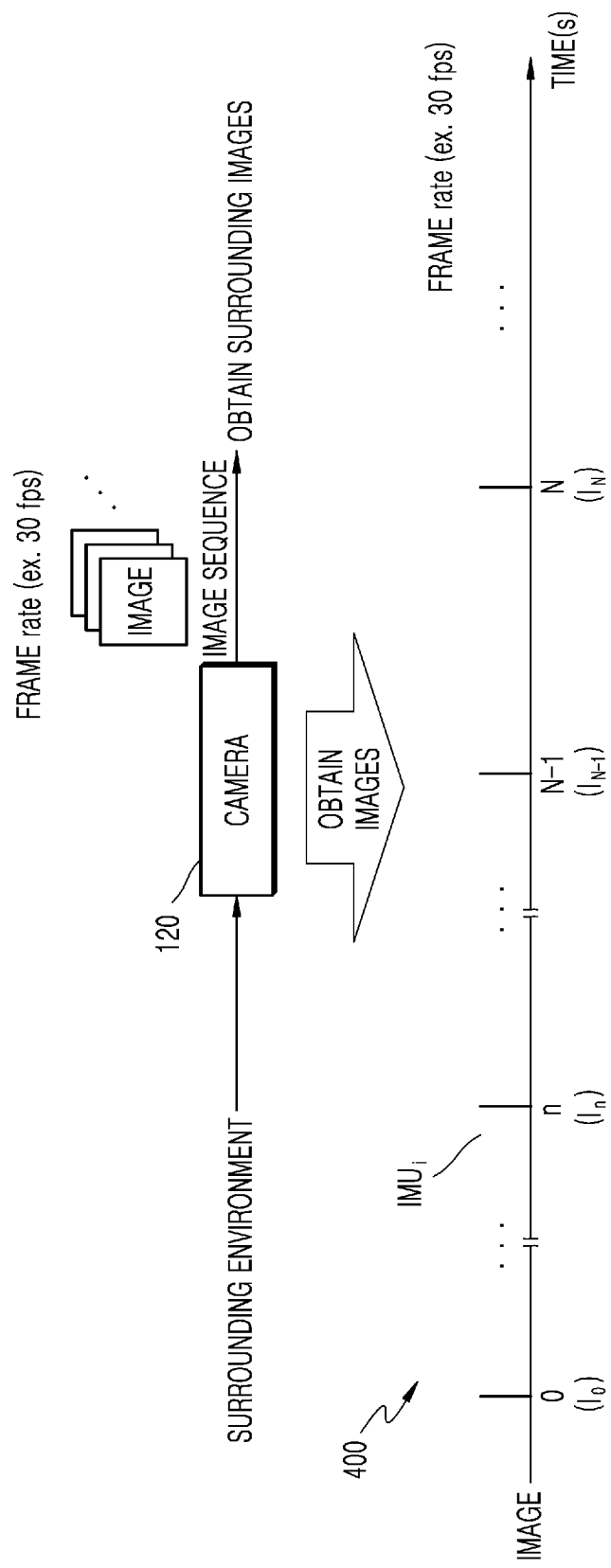
FIG. 4 is a timing diagram of time points for obtaining images via a camera according to an example embodiment.

FIG. 4 is a timing diagram of time points for obtaining images via a camera according to an example embodiment. Referring to FIG. 4, the camera 120 obtains surrounding images of the AR devices 10 at the frame rate of second frequency. According to an example embodiment, the frame rate may be 30 fps, but embodiments are not limited thereto. The second frequency at which images are obtained from the camera 120 is lower than the first frequency at which IMU values are obtained from the IMU sensor 110. In other words, the IMU rate of a first frequency is a relatively high frequency, and the frame rate of a second frequency is a relatively low frequency. In a timing diagram 400 of FIG. 4, each of vertical bars denotes a time point when an image is obtained. For example, an image obtained at a time point 0 may be expressed as $I_0$, . . . , an image obtained at a time point n may be expressed as $I_n$, . . . , an image obtained at a time point N−1 may be expressed as $I_{N-1}$, and an image obtained at a time point N may be expressed as $I_N$, where n and N are natural numbers.

Referring back to FIG. 2, according to an example embodiment, the VI-SLAM module 130 is a hardware component (e.g., a hardware processor) that performs a calculation for estimating a relative position of a camera to a map by fusing visual data and inertia data, that is, visual-inertia fusion.

When a pose is estimated with only the IMU values at an IMU rate obtained from the IMU sensor 110, the pose may not be accurate due to noise of the obtained IMU values and slowly varying bias. Furthermore, when a pose is estimated by performing SLAM processing with only the images obtained from the camera 120, it may be difficult to perform a high speed pose calculation. Accordingly, the VI-SLAM module 130 may improve accuracy of the SLAM processing by performing visual-inertia fusion based pose estimating in a VI-SLAM method of compensating for error values by using the IMU values obtained from the IMU sensor 110 and the images obtained from the camera 120.

For example, a good camera pose may not be calculated due to various factors such as occlusion due to flat areas, for example, walls, poor lighting, motion blur/focus problem, a high speed camera motion, or hand shake. However, in the example embodiment, as learning of camera poses by a visual-inertia fusion based deep neural network (DNN) is performed, the accuracy of the pose prediction of the AR device 10 may be increased even in a situation when an appropriate camera image is not obtained.

The VI-SLAM module 130 may estimate intermediate 6-degrees of freedom poses (intermediate 6D poses) of the AR device 10 based on the images (image sequence) obtained by the camera 120 at the frame rate of a second frequency and inputs of the IMU values (IMU sequence) obtained from the IMU sensor 110. The "intermediate" 6D pose means a pose according to an intermediate calculation result before predicting a final 6D pose (that is, a relative 6D pose).

In one embodiment, the VI-SLAM module 130 may perform estimating of the intermediate 6D poses whenever images are obtained at the frame rate of a second frequency. In this case, the estimating of intermediate 6D poses may be performed at the frame rate of a second frequency. In other words, the intermediate 6D poses in this case may be first type pose data of a frame rate of a second frequency estimated by performing the SLAM technique for fusing the IMU values and the images obtained at the frame rate of the second frequency.

Figure 5A:
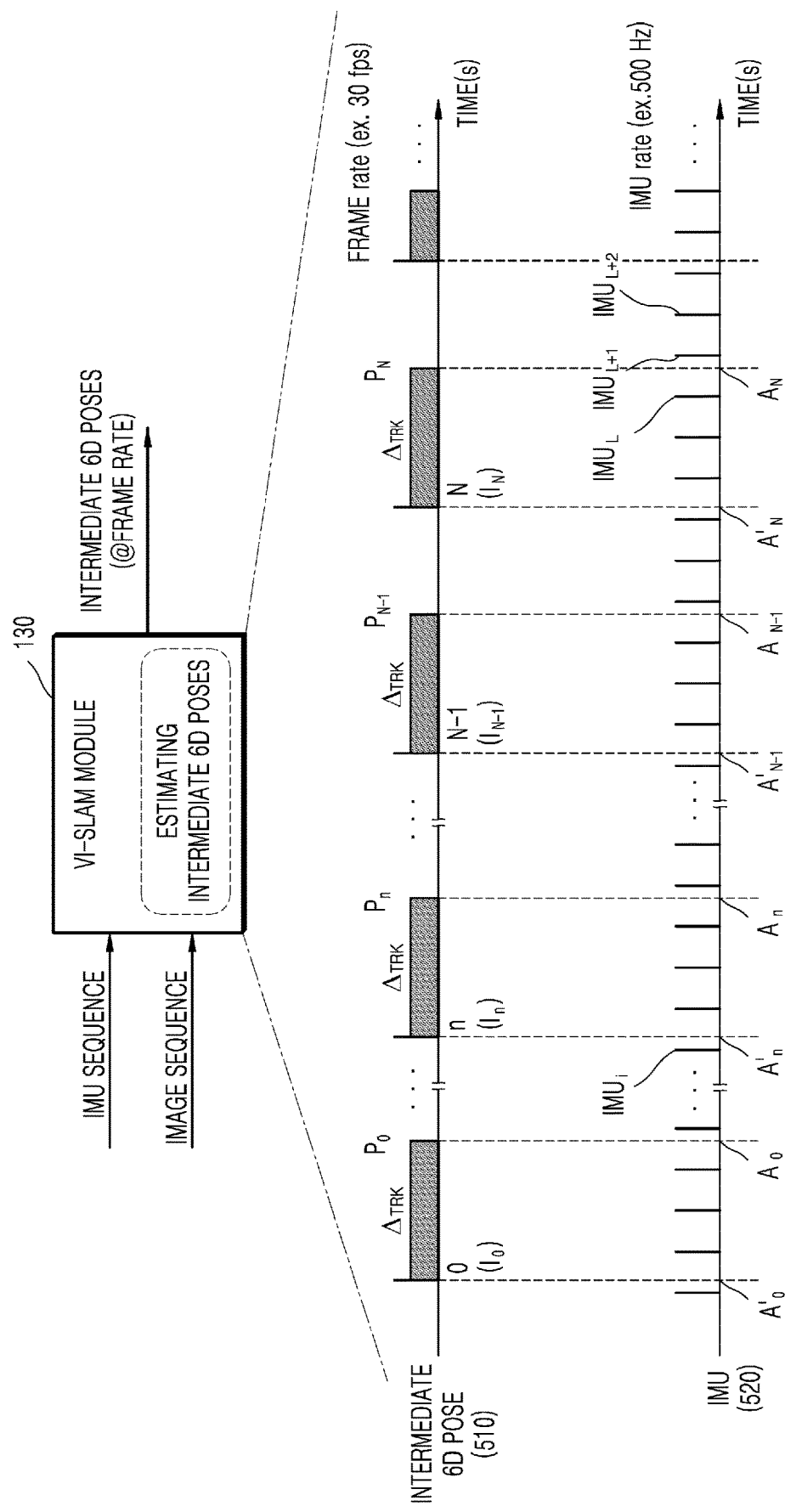
FIG. 5A is a timing diagram of time points for estimating an intermediate six degrees (6D) pose via a VI-SLAM module according to an example embodiment.

Furthermore, in another example embodiment, between the time points when images are obtained at the frame rate of a second frequency images, the VI-SLAM module 130 may perform estimating of intermediate 6D poses at the IMU rate of a first frequency by calculating an integral value of angular velocity and an integral value of acceleration of each axis through a pre-integration method from the IMU values between the time points when images are obtained at a frame rate. In other words, the intermediate 6D poses in this case may be second type pose data of the IMU rate including pose data corresponding to the integral values calculated by the pre-integration method from the IMU values and the image based pose data of a frame rate estimated by performing the above-described SLAM technique FIG. 5A is a timing diagram of time points for estimating an intermediate 6D pose in a VI-SLAM module according to an example embodiment. Referring to FIG. 5A, the VI-SLAM module 130 may receive inputs of the IMU values 520 obtained at the IMU rate and the images obtained at a frame rate, and estimate intermediate 6D poses 510 at a frame rate.

In detail, the VI-SLAM module 130 may obtain an intermediate 6D pose $P_0$ by performing a calculation during a calculation time $\Delta_{TRK}$ with an image $I_0$ obtained at a time point 0 and the IMU values obtained between a time point $A'_0$ and a time point $A_0$. Although the calculation of the intermediate 6D pose $P_0$ is completed at the time point $A_0$, the intermediate 6D pose $P_0$ may be regarded to correspond to a pose at the time point $A'_0$. In the same manner, the VI-SLAM module 130 may obtain each of an intermediate 6D pose $P_n$, an intermediate 6D pose $P_{N-1}$, and an intermediate 6D pose $P_N$ through a calculation during the calculation time $\Delta_{TRK}$, and the obtained intermediate 6D pose $P_n$, intermediate 6D pose $P_{N-1}$, and intermediate 6D pose $P_N$ may be regarded to correspond to a pose at a time point $A'_n$, a pose at a time point $A'_{N-1}$, and a pose at a time point $A'_N$, respectively. As described below, whenever the VI-SLAM module 130 completes the estimation of an intermediate 6D pose, the estimated intermediate 6D pose is updated to a ground truth (GT) at an actual time point, for example, the time point $A'_0$, . . . , the time point $A'_n$, the time point $A'_{N-1}$, the time point $A'_N$, when an image is photographed, and may be used for learning.

Figure 5B:
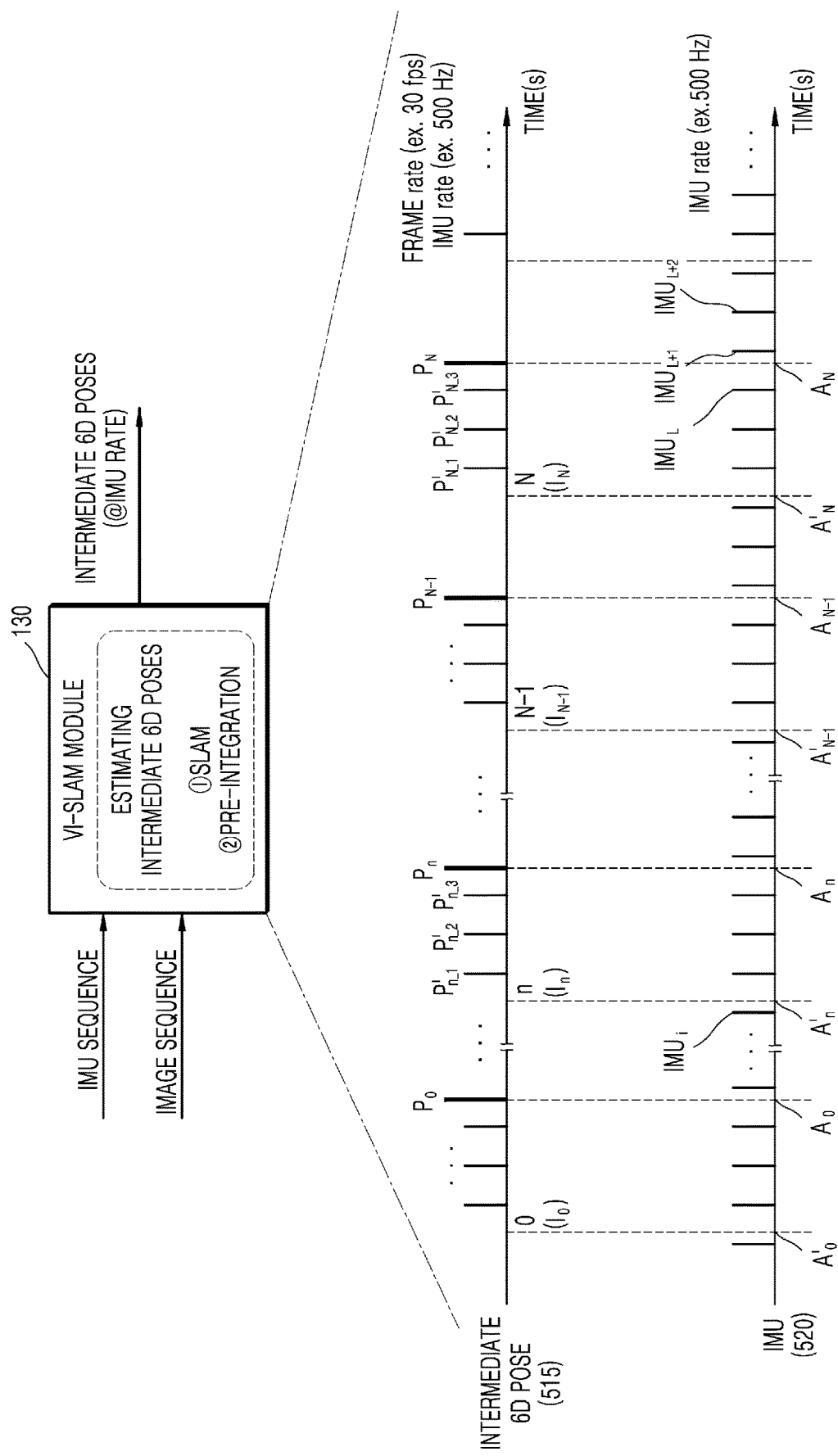
FIG. 5B is a timing diagram of time points for estimating an intermediate 6D pose via a visual-inertial simultaneous localization and mapping (VI-SLAM) module according to another example embodiment.

FIG. 5B is a timing diagram of time points for estimating an intermediate 6D pose via a VI-SLAM module according to another example embodiment. Referring to FIG. 5B, unlike FIG. 5A, the VI-SLAM module 130 estimates intermediate 6D poses 515 at the IMU rate.

In detail, the VI-SLAM module 130 obtains an integral value of acceleration of each axis and an integral value of angular velocity by performing integration twice on the IMU values 520 obtained at the IMU rate. The integral values may correspond to a 6D pose that is estimated singularly from the IMU values 520. In other words, the VI-SLAM module 130 predicts intermediate 6D poses ( . . . , $P'_{n\_1}$, $P'_{n\_2}$, $P'_{n\_3}$, . . . , $P'_{N\_1}$, $P'_{N\_2}$, $P'_{N\_3}$, . . . ) obtained at the IMU rate based on the IMU integration at time points between intermediate 6D poses ($P_0$, $P_n$, $P_{N-1}$, $P_N$, . . . ) obtained at a frame rate, by performing pre-integration on the IMU values 520. As such, as the IMU integration based intermediate 6D poses ( . . . , $P'_{n\_1}$, $P'_{n\_2}$, $P'_{n\_3}$, . . . , $P'_{N\_1}$, $P'_{N\_2}$, $P'_{N\_3}$, . . . ) are estimated through pre-integration process ① in addition to the camera image based intermediate 6D poses ($P_0$, $P_n$, $P_{N-1}$, $P_N$, . . . ) that are estimated through the SLAM process ②, even when a camera image may not be smoothly used due to a problem such as occlusion or blur, the VI-SLAM module 130 may continuously output an estimation result of the intermediate 6D poses 515.

Referring back to FIG. 2, the processor 140 is a hardware component that may control the overall operation of the AR device 10 by running an operating system or an application program, and may perform various data processing and operations including pose prediction and AR image generation. The processor 140 may include, for example, central processing units (CPUs), microprocessors, graphic processing units (GPUs), application specific integrated circuits (ASICs), digital signal processors (DSPs), digital signal processing devices (DSPDs), programmable logic devices (PLDs), field programmable gate arrays (FPGAs), application processors (APs), neural processing units (NPUs), or tensor processing units (TPU), but embodiments are not limited thereto.

The processor 140 generates a pose prediction model that predicts a relative 6D poses of the AR device 10 by performing learning based on inputs of the intermediate 6D poses and the IMU values obtained by using the DNN. The "relative" 6D pose may mean a pose difference between an intermediately previously predicted 6D pose (original pose) and a currently predicted 6D pose (transformed pose). Also, the relative 6D pose may mean a final pose finally obtained by being calculated from an intermediate 6D pose.

According to an example embodiment, the pose prediction model may perform DNN learning with multi-rate inputs including the IMU inputs of an IMU rate and the intermediate 6D pose inputs of a frame rate. In other words, as the IMU rate is a frequency higher than the frame rate, the pose prediction model may perform learning for pose prediction and inference for pose prediction with inputs of different frequencies.

Furthermore, according to another example embodiment, the pose prediction model may perform DNN learning with multi-rate inputs of the intermediate 6D pose inputs including the IMU inputs of an IMU rate, the IMU integration based intermediate 6D pose inputs of an IMU rate, and the image based intermediate 6D pose inputs of a frame rate.

As the IMU inputs and the intermediate 6D pose inputs that are input to the pose prediction model correspond to a temporal data sequence, the DNN may be implemented as a recurrent neural network (RNN) using a long short term memory (LSTM) or a gated recurrent unit (GRU). The pose prediction model may be a model that performs DNN learning in a self-supervised method based on the update of a GT pose described above in FIG. 5A.

When IMU values that are newly obtained according to a movement of the AR device 10 and intermediate 6D poses that are newly estimated according to the movement of the AR device 10 are input to the learned DNN of a pose prediction model, the processor 140 may output a result of the inference of predicting a relative 6D poses in real time through the processing by the learned DNN of a pose prediction model.

The processor 140 may perform DNN learning by using the IMU values and camera images obtained during the use of the AR device 10, or the 6D poses calculated by the VI-SLAM module 130 in a state when the AR device 10 is not used for a certain period, for example, in a charge state. When a user wears the AR device 10 again to use, the processor 140 may complete the DNN learning and perform inference of the DNN for prediction of the pose of the AR device 10.

The memory 150 may include an internal memory such as a volatile memory or a non-volatile memory. The memory 150 may store, under the control of the processor 140, various data, programs, or applications for driving and controlling the AR device 10, and input/output signals or AR data. Furthermore, the memory 150 may store data related to the DNN. The memory 150 may correspond to a memory device such as random access memory (RAM), read-only memory (ROM), hard disk drive (HDD), solid state drive (SSD), compact flash (CF), secure digital (SD), micro secure digital (Micro-SD), mini secure digital (mini-SD), extreme digital (xD), Memory Stick, etc., and the type of the memory 150 is not limited thereto and to be various.

Figure 6:
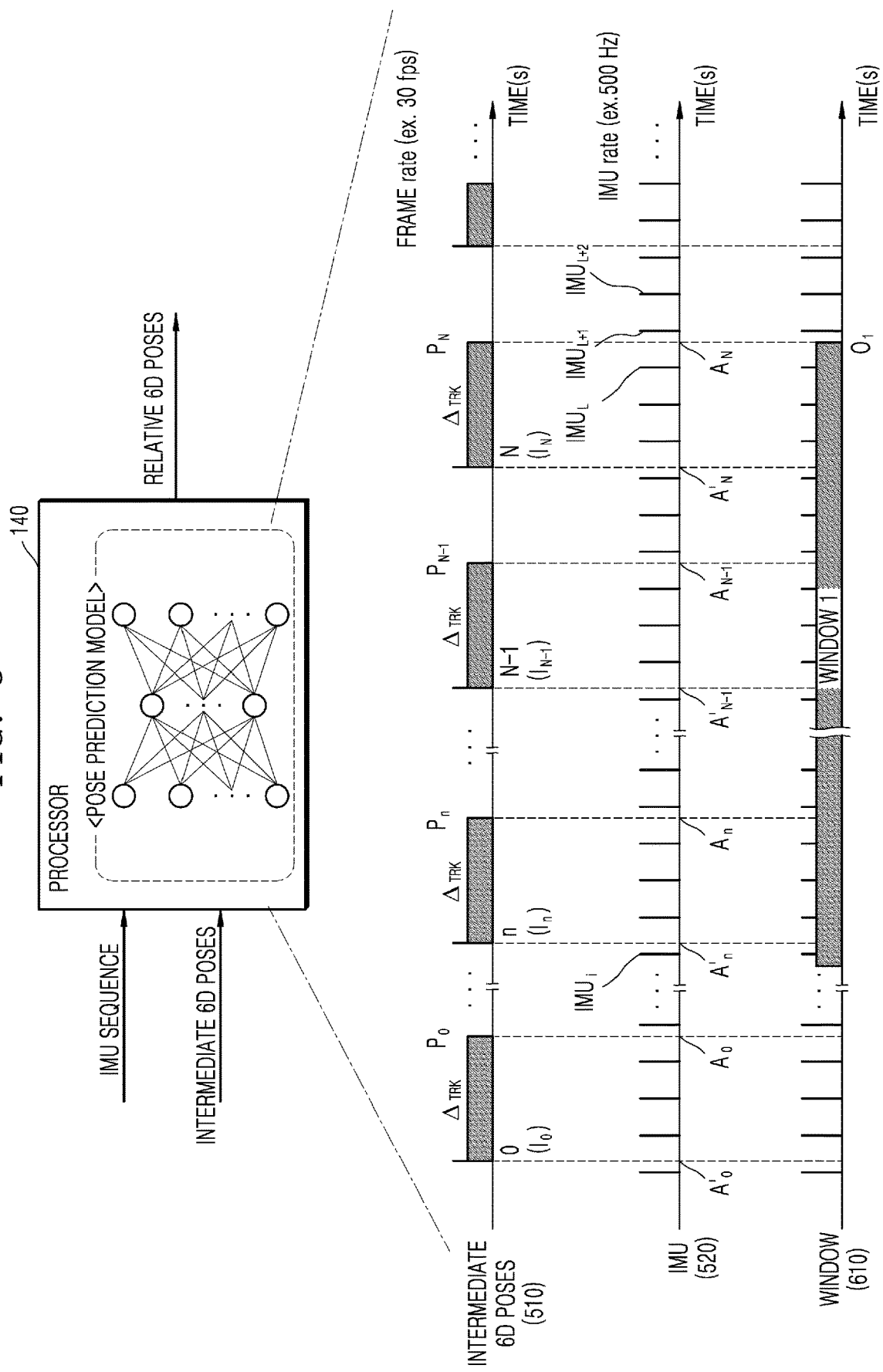
FIG. 6 is a timing diagram of a method of generating a pose prediction model according to an example embodiment.

FIG. 6 is a timing diagram of a method of generating a pose prediction model according to an embodiment.

Referring to FIG. 6, the processor 140 receives the IMU values 520 obtained from the IMU sensor 110 of FIG. 2 and the intermediate 6D poses 510 estimated by the VI-SLAM module 130 of FIG. 2, as inputs.

In detail, the processor 140 may perform learning for pose prediction on the DNN with inputs of a window moving in a sliding manner. The window moving in a sliding manner may include k IMU values, where k is a natural number, and m intermediate 6D poses, where m is a natural number. For example, WINDOW 1 610 may be set to include IMU values from $IMU_i$ to $IMU_L$ and intermediate 6D poses from $P_n$ to $P_N$. In other words, the DNN performs learning with multi-rate inputs including the IMU inputs of an IMU rate and the intermediate 6D pose inputs of a frame rate.

The processor 140 may output relative 6D pose $O_1$ of the AR device 10 through processing of WINDOW 1 610 input to the DNN.

Figure 7A:
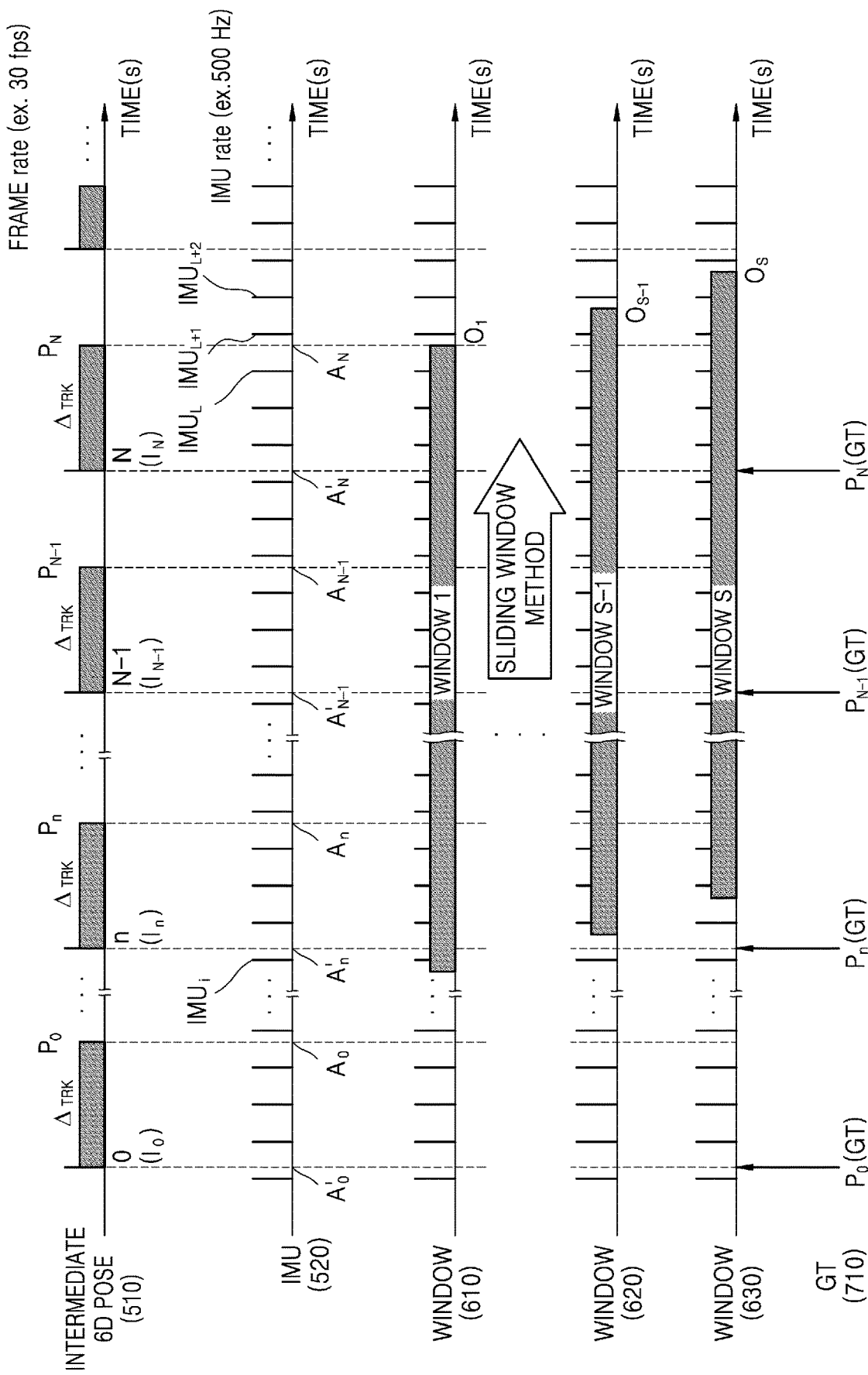
FIG. 7A is a timing diagram of a method of performing pose prediction in a pose prediction model by a sliding window method according to an example embodiment.

FIG. 7A is a timing diagram of a method of performing pose prediction in a pose prediction model by a sliding window method according to an example embodiment.

Referring to FIG. 7A, when a relative 6D pose $O_1$ is predicted through the processing on WINDOW 1 610, the window may slide based on the IMU rate. In other words, the window may slide on a time axis in units of time points for obtaining one IMU value.

The processor 140 may output a relative 6D pose $O_{S-1}$ of the AR device 10 through processing on WINDOW S-1 620 sliding by using the DNN, and output a relative 6D pose $O_S$ of the AR device 10 through processing on WINDOW S 630 sliding by using the DNN. In other words, the DNN based pose prediction model may receive inputs of a multi-rate (IMU rate and frame rate), but output a relative 6D pose corresponding to each window at an IMU rate.

The DNN based pose prediction model, when performing learning of predicting a relative 6D pose, may perform learning in the self-supervised learning method (or an unsupervised learning method) based on the update of a GT pose 710. For example, during the DNN learning, an intermediate 6D pose at a timing matching a timing of outputting a window may be used as the GT pose 710 for outputting the window.

Whenever the estimation on an intermediate 6D pose is completed by the VI-SLAM module 130 of FIG. 2, the GT pose 710 may be set by updating the estimated intermediate 6D pose to GT pose ($P_0(GT), \ldots, P_n(GT), \ldots, P_{M-1}(GT), P_N(GT), \ldots$) at a real time point when an image is photographed.

The DNN may perform a back propagation through time (BPTT) by reducing a loss function by using the updated GT pose, and accordingly weight parameters of the DNN are updated to appropriate values so that pose prediction accuracy of the DNN based pose prediction model may be improved.

Figure 7B:
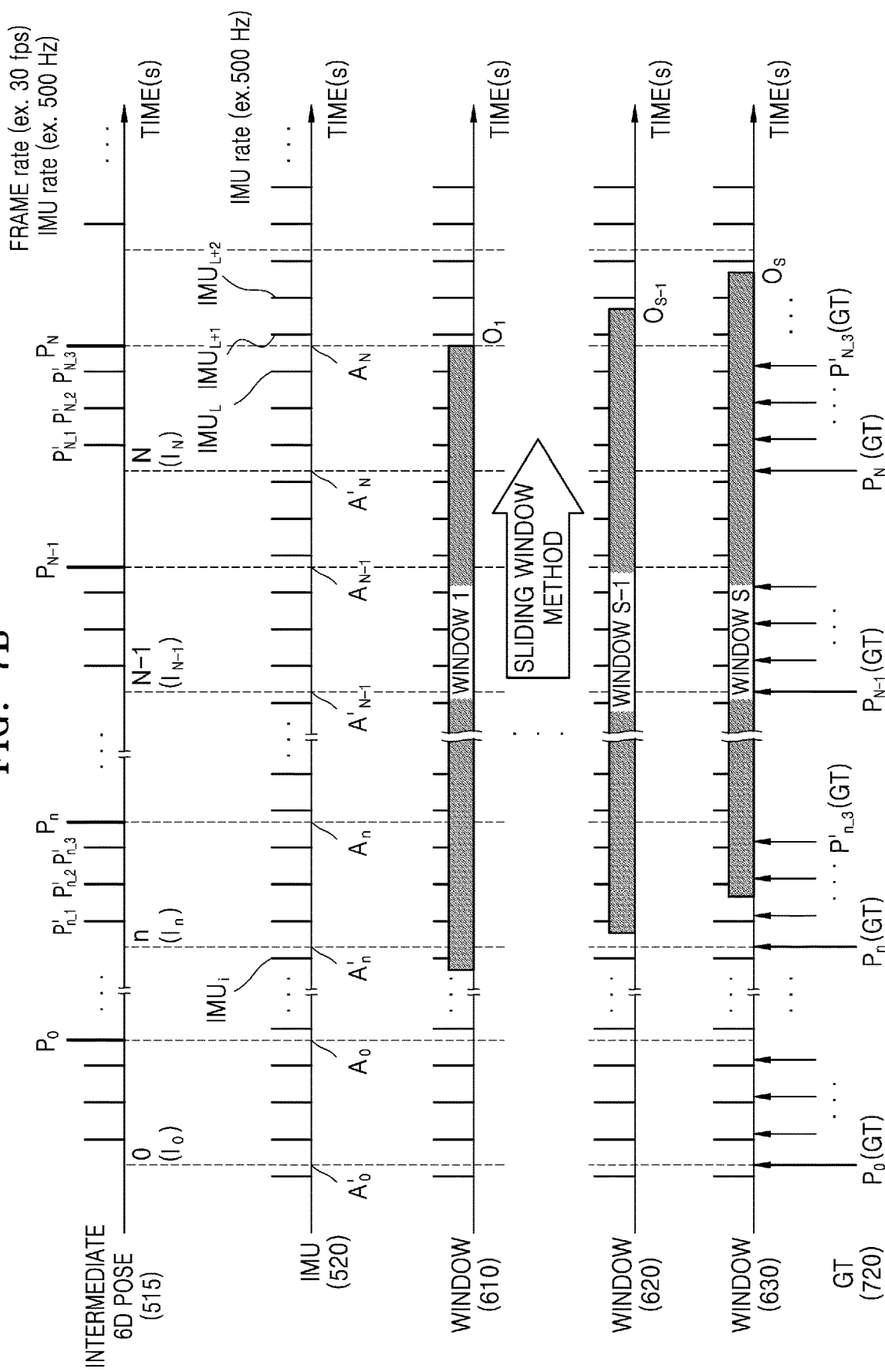
FIG. 7B is a timing diagram of a method of performing pose prediction in a pose prediction model by a sliding window method according to another example embodiment.

FIG. 7B is a timing diagram of a method of performing pose prediction in a pose prediction model by a sliding window method according to another example embodiment.

Referring to FIG. 7B, unlike FIG. 7A, the processor 140 receives, as multi-rate inputs of the DNN, intermediate 6D pose inputs 515 including the IMU values 520, the IMU integration based intermediate 6D pose inputs ($\ldots, P'_{n\_1}, P'_{n\_2}, P'_{n\_3}, \ldots, P'_{N\_1}, P'_{N\_2}, P'_{N\_3}, \ldots$) of a IMU rate and the image based intermediate 6D pose inputs ($P_0, P_n, P_{N-1}, P_N, \ldots$) of a frame rate. Accordingly, a GT pose 720 may be updated at a time interval shorter than the update of the GT pose 710 of FIG. 7A, and accordingly even at a timing when a camera image may not be smoothly used due to a problem such as occlusion or blur, the DNN may relatively accurately output a prediction result of relative 6D poses.

Figure 8:
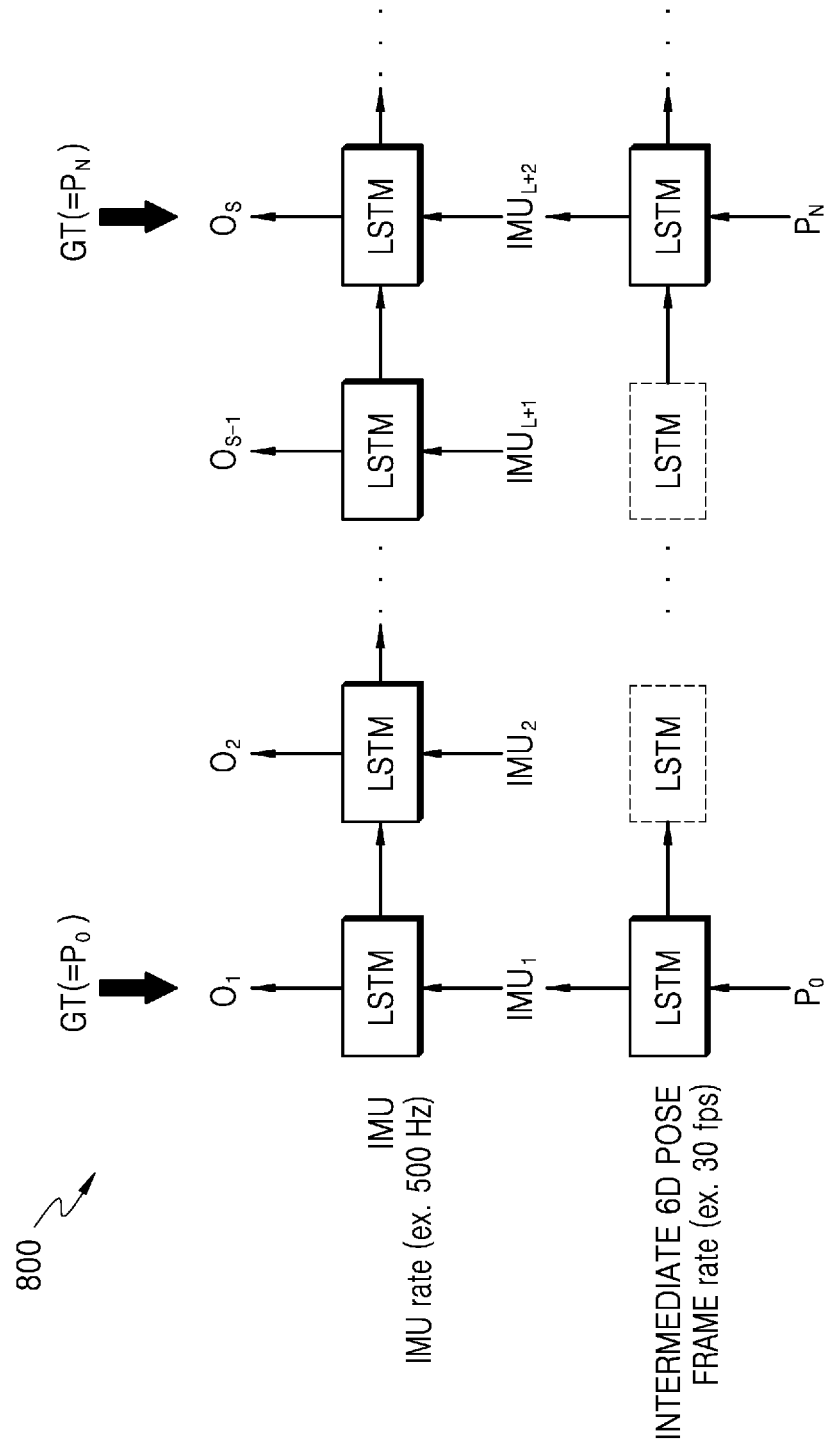
FIG. 8 is a diagram of a pose prediction model based on a deep neural network (DNN) implemented by a recurrent neural network (RNN) using a long short term memory (LSTM) according to an example embodiment.

FIG. 8 is a diagram of a pose prediction model based on a DNN implemented by the RNN using the LSTM according to an example embodiment.

According to an example embodiment, since the inputs used for pose prediction in the AR device 10 of FIG. 1 correspond to the temporal data sequence, the pose prediction model may be implemented by the RNN. However, even so, the pose prediction model is not necessarily limited to an RNN based neural network and may employ a different type of a neural network.

The RNN is a kind of a neural network that is efficient for predicting present information by using past information. However, as the RNN has a problem such as long-term dependency, an LSTM type RNN is introduced to solve the problem. The LSTM may separately include a cell state and a hidden layer. In the LSTM, the cell state manages information memory and erases unimportant information (forget gate), and the hidden layer updates only important information to a cell (input gate), so that the long-term dependency problem of the RNN may be solved.

Referring to FIG. 8, an unrolled multi-rate LSTM is illustrated. IMU values of an IMU rate of a first frequency, for example, 500 Hz, and intermediate 6D poses of a frame rate of second frequency, for example, 30 fps, are input to the LSTM. As such, as the LSTM performs learning of pose prediction with multi-rate inputs, the LSTM where an input (intermediate 6D pose) of a rate of a low frequency (second frequency) is stored may be changed, as indicated by a dashed line, to inactivated states in the middle of learning. The inputs of the past IMU values and past intermediate 6D poses stored in LSTM may be transmitted to cells of other LSTM to be related to prediction of a relative 6D pose at a different timing.

In a pose prediction model where learning for pose prediction is performed by an LSTM-type RNN, as loss function is reduced by performing the BPTT by using the updated GT poses ($P_0, \ldots, P_N, \ldots$), pose prediction accuracy of the LSTM based pose prediction model may be improved.

According to another example embodiment, the DNN based pose prediction model may be implemented by the RNN using a gated recurrent unit (GRU), instead of the LSTM, and a person skilled in the art could understand that a GRU method may operate similarly to the method described above regarding the LSTM.

Figure 9:
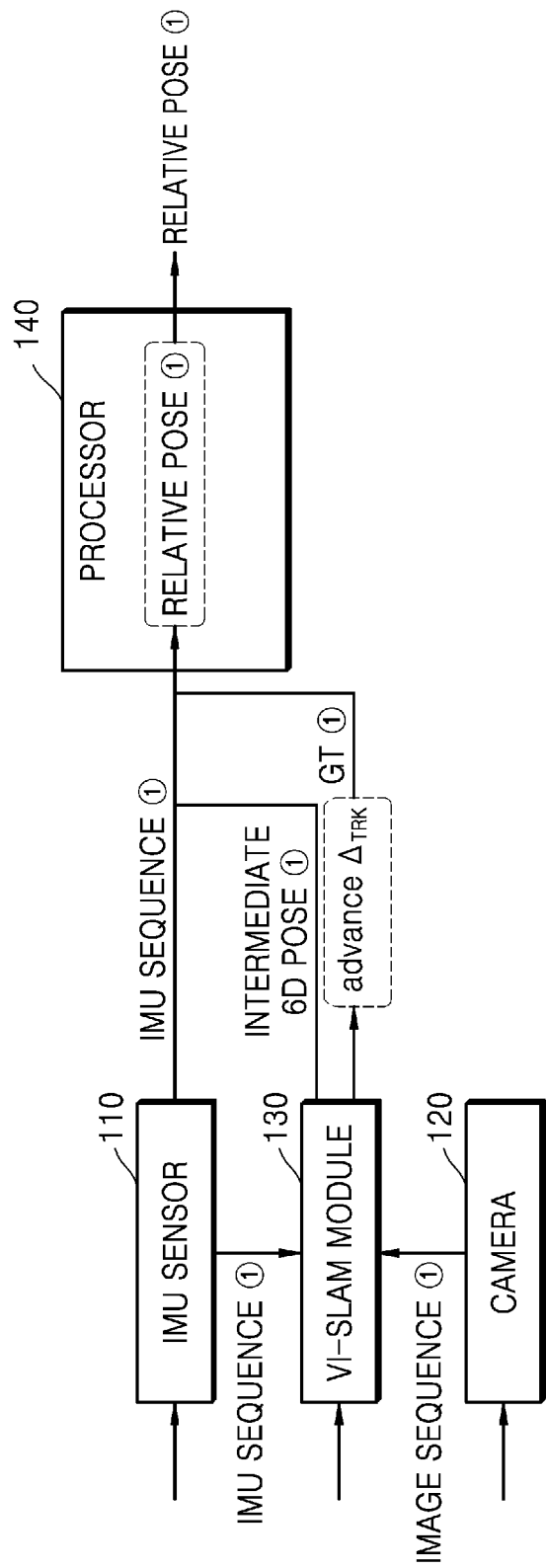
FIGS. 9 and 10 are block diagrams of performing pose prediction in a processor according to some example embodiments.
Figure 10:
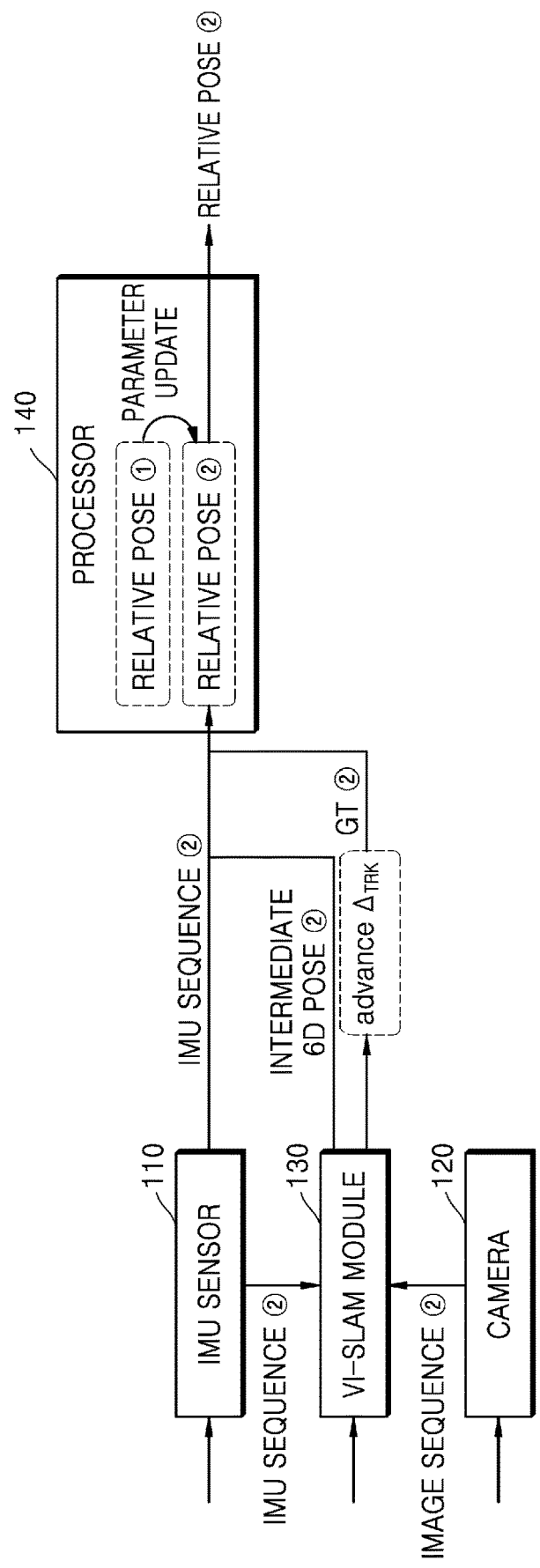

FIGS. 9 and 10 are block diagrams of performing pose prediction in a processor according to an example embodiment.

Referring first to FIG. 9, the IMU sensor 110 transmits temporal data of temporal data of an IMU sequence ① including the IMU values obtained at an IMU rate to the VI-SLAM module 130, and the camera 120 transmits temporal data of an image sequence ① including images obtained at a frame rate to the VI-SLAM module 130. The IMU sensor 110 transmits the IMU sequence ① to the processor 140 for pose prediction.

The VI-SLAM module 130 estimates an intermediate 6D pose based on the IMU sequence ① and the image sequence ①, and transmits an estimated intermediate 6D pose ① to the processor 140. In this case, the VI-SLAM module 130 updates the estimated intermediate 6D pose ① to a GT pose ① at a real time point (advance $\Delta_{TRK}$) when an image is photographed, and transmits an updated GT pose ① to the processor 140.

The processor 140 calculates an output regarding the IMU sequence ① and the intermediate 6D pose ① by using the DNN based pose prediction model, and outputs a relative pose ① as a result thereof.

Next, referring to FIG. 10, the VI-SLAM module 130 estimates an intermediate 6D pose ② based on an IMU sequence ② obtained from the IMU sensor 110 and an image sequence ② obtained from the camera 120, and transits an estimated intermediate 6D pose ② to the processor 140. The processor 140 calculates an output regarding the IMU sequence ② and the intermediate 6D pose ② by using the DNN based pose prediction model, and outputs a relative pose ② as a result thereof.

When the relative pose ② is predicted, the processor 140 may update weight parameters through backpropagation, for example, the BPTT, of the DNN, based on the updated GT pose ① and the updated GT pose ②. According to an example embodiment, the processor 140 may repeatedly perform the above-described processes to predict the subsequent relative poses.

In FIGS. 9 and 10, signs of ① and ② denote that data of different time points are included.

Figure 11A:
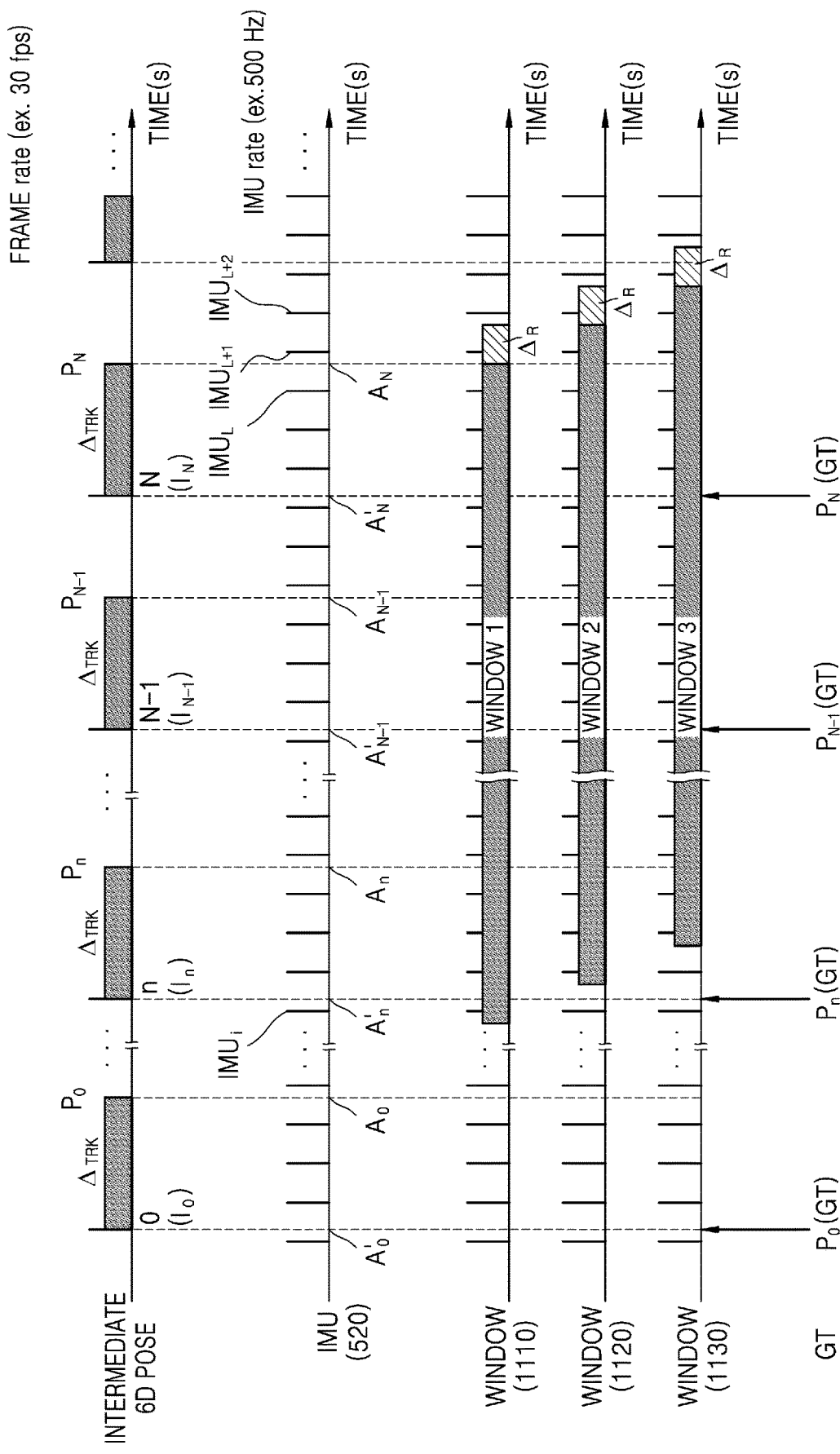
FIGS. 11A and 11B are time diagrams of performing inference of pose prediction in a pose prediction model based on a DNN that has completed learning according to some example embodiments.
Figure 11B:
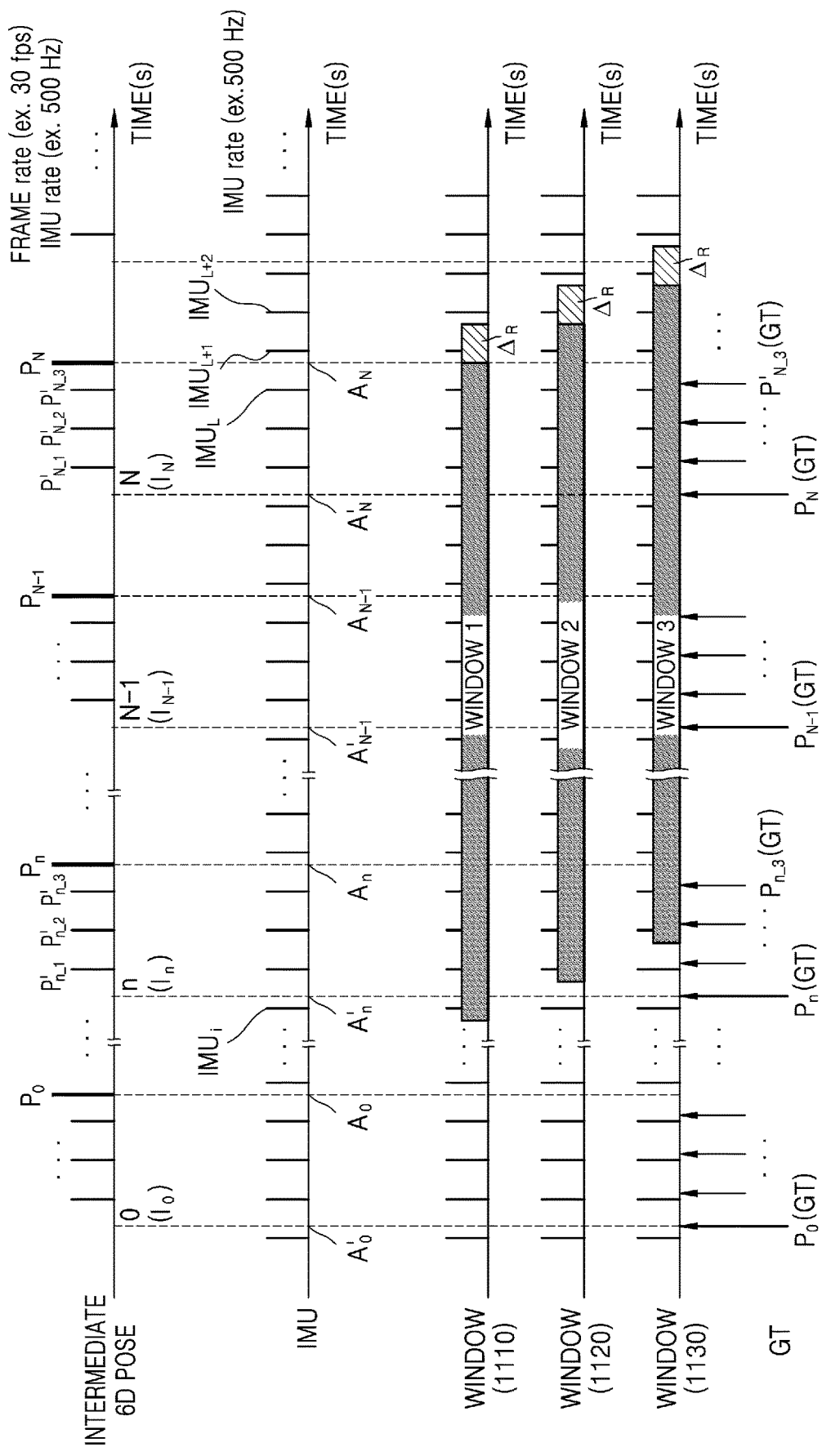

FIGS. 11A and 11B are time diagrams of performing inference of pose prediction in a pose prediction model based on a DNN that has completed learning according to some embodiments.

Referring to FIGS. 11A and 11B, learning for pose prediction is performed based on the IMU values and the intermediate 6D poses input to the DNN, and when parameters of the DNN are updated by the updated GT poses, DNN learning is completed and thus a pose prediction model may be generated. When newly obtained IMU values and newly estimated intermediate 6D poses according to the movement of the AR device 10 of FIG. 1 are input to the pose prediction model generated based on the learned DNN, the processor 140 of FIG. 2 may output an inference result of predicting relative 6D poses in real time through processing by the learned DNN of a pose prediction model.

For example, as described above, IMU values and intermediate 6D poses may be input to the learned DNN in a sliding window method. When WINDOW 1 1110 is input, the processor 140 performs inference of a prediction result of a relative 6D pose by processing inputs in WINDOW 1 1110 during a calculation time $\Delta_R$, and outputs an inference result corresponding to WINDOW 1 1110, that is, a predicted relative 6D pose. Likewise, the processor 140 performs inference regarding a case when WINDOW 2 1120 that has slid is input and a case when WINDOW 3 1130 that has slid is input, and outputs inference results, that is, predicted relative 6D poses.

As the DNN has completed learning for pose prediction based on the input IMU values and intermediate 6D poses, the processor 140 may not only infer present and future 6D poses of the AR device 10 based on a result of the DNN learning, but also output a prediction result of a future 6D pose of the AR device 10.

Figure 12:
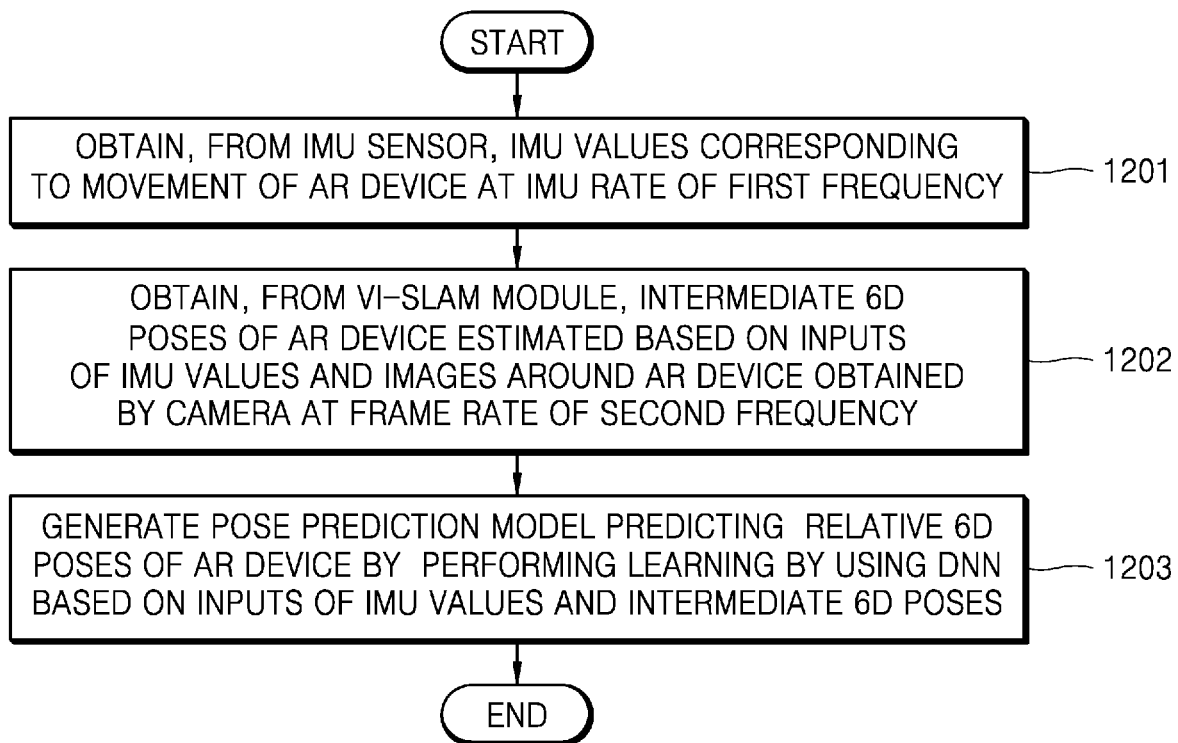
FIG. 12 is a flowchart of a method of predicting a pose in an AR device according to an example embodiment.

FIG. 12 is a flowchart of a method of predicting a pose in an AR device according to an example embodiment. Referring to FIG. 12, as the pose prediction method in the AR device 10 of FIG. 1 is related to the example embodiments in the above-described drawings, the contents described in the above drawings, even when omitted in the following description, may be applied to the method of FIG. 12.

In operation 1201, the processor 140 may obtain, from the IMU sensor 110, IMU values corresponding to the movement of the AR device 10 at an IMU rate of a first frequency.

In operation 1202, the processor 140 may obtain, from the VI-SLAM module 130, intermediate 6D poses of the AR device 10 which are estimated based on inputs of the IMU values and images of the environment surrounding the AR device 10 obtained by the camera 120 at a frame rate of a second frequency.

In operation 1203, the processor 140 performs learning using the DNN based on the inputs of the IMU values and the intermediate 6D poses, thereby generating a pose prediction model that predicts relative 6D poses of the AR device 10.

The above-described example embodiments may be written as a program that is executable in a computer, and may be implemented in a general purpose digital computer for operating the program by using a computer-readable recording medium. Furthermore, a structure of data used in the above-described example embodiments may be recorded through various means on a computer-readable recording medium. The computer-readable recording medium may include storage media such as magnetic storage media, for example, ROM, floppy disks, or hard disks, or optical reading media, for example, CD-ROM or DVD.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A method of predicting a pose in an augmented reality (AR) device, the method comprising:
    obtaining, using an inertial measurement unit (IMU) sensor provided in the AR device, IMU values corresponding to a movement of the AR device at an IMU rate of a first frequency;
    estimating intermediate 6-degrees of freedom (6D) poses of the AR device based on the obtained IMU values and images surrounding the AR device, the images being obtained at a frame rate of a second frequency by a camera provided in the AR device;
    generating, by a processor, a pose prediction model for predicting relative 6D poses of the AR device;
    inputting the IMU values as a first input to the pose prediction model, and separately inputting the intermediate 6D poses, which are estimated prior to predicting the relative 6D, as a second input to the pose prediction model; and
    outputting the relative 6D poses of the AR device by performing learning based on the obtained IMU values and the intermediate 6D poses using a deep neural network implemented by the pose prediction model.

2. The method of claim 1, wherein the intermediate 6D poses comprise:
    first type pose data of a frame rate estimated by using a simultaneous localization and mapping (SLAM) technique of fusing the obtained IMU values and the images obtained at the frame rate of the second frequency, or
    second type pose data of the IMU rate of the first frequency including pose data corresponding to integral values calculated by a pre-integration method from the obtained IMU values and image based pose data of the frame rate estimated by using the SLAM technique.

3. The method of claim 1, wherein the pose prediction model outputs relative 6D poses, each corresponding to a window moving in a sliding manner, according to the learning of the deep neural network based on k IMU values, from among the IMU values, and m intermediate 6D poses, from among the intermediate 6D poses, and
    wherein k is a natural number and m is a natural number in the window.

4. The method of claim 3, wherein the window slides based on the IMU rate and the k IMU values and the m intermediate 6D poses corresponding to the sliding window is input to the deep neural network, and
    the pose prediction model outputs the relative 6D pose corresponding to each window at the IMU rate.

5. The method of claim 1, further comprising updating and setting the estimated intermediate 6D pose to a ground truth (GT) pose at a real time point when an image is photographed, based on estimation on the intermediate 6D pose being completed.

6. The method of claim 5, wherein the pose prediction model performs the learning using the deep neural network via a self-supervised method based on updating of the GT pose.

7. The method of claim 1, wherein the pose prediction model performs the learning using the deep neural network with multi-rate inputs including the IMU values at the IMU rate of the first frequency and the intermediate 6D pose at the frame rate of the second frequency, and
    the first frequency is greater than the second frequency.

8. The method of claim 1, wherein the deep neural network comprises a recurrent neural network using a long short term memory or a gated recurrent unit.

9. The method of claim 8, wherein the deep neural network performs back propagation through time by reducing a loss function using an updated ground truth (GT) pose.

10. The method of claim 1, further comprising, based on newly obtained IMU values and newly estimated intermediate 6D poses according to the movement of the AR device being input to the learned deep neural network of the pose prediction model, outputting a result of an inference of predicting relative 6D poses in real time through processing by the learned deep neural network of the pose prediction model.

11. The method of claim 1, wherein the same IMU values used to estimate the intermediate 6D poses are input as the first input to the pose prediction model, and
    wherein the first input and the second input are input in parallel to the pose prediction model.

12. A non-transitory computer readable recording medium having recorded thereon a program for executing, in a computer, a method of predicting a pose in an augmented reality (AR) device, the method comprising:
    obtaining, using an inertial measurement unit (IMU) sensor provided in the AR device, IMU values corresponding to a movement of the AR device at an IMU rate of a first frequency;
    estimating intermediate 6-degrees of freedom (6D) poses of the AR device based on the obtained IMU values and images surrounding the AR device, the images being obtained at a frame rate of a second frequency by a camera provided in the AR device;
    generating, by a processor, a pose prediction model for predicting relative 6D poses of the AR device;
    inputting the IMU values as a first input to the pose prediction model, and separately inputting the intermediate 6D poses, which are estimated prior to predicting the relative 6D, as a second input to the pose prediction model; and outputting the relative 6D poses of the AR device by performing learning based on the obtained IMU values and the intermediate 6D poses using a deep neural network implemented by the pose prediction model.

13. An augmented reality (AR) device comprising:
an inertial measurement unit (IMU) sensor configured to obtain IMU values corresponding to a movement of the AR device at an IMU rate of a first frequency;
a camera configured to obtain images surrounding the AR device at a frame rate of a second frequency;
a visual-inertial simultaneous localization and mapping (VI-SLAM) module configured to estimate intermediate 6-degrees of freedom (6D) poses of the AR device based on the obtained IMU values and the images surrounding the AR device; and
a processor configured to generate a pose prediction model for predicting relative 6D poses of the AR device,
wherein the IMU values are input as a first input to the pose prediction model, and the intermediate 6D poses, which are estimated prior to predicting the relative 6D, are separately input as a second input to the pose prediction model, and
wherein the relative 6D poses of the AR device are output by performing learning based on the obtained IMU values and the intermediate 6D poses using a deep neural network implemented by the pose prediction model.

14. The AR device of claim 13, wherein the pose prediction model outputs the relative 6D poses, each corresponding to a window moving in a sliding manner, according to the learning of the deep neural network based on k IMU values, from among the IMU values, and m intermediate 6D poses, from among the intermediate 6D poses, and
wherein k is a natural number and m is a natural number in the window.

15. The AR device of claim 14, wherein the window slides based on the IMU rate and the k IMU values and the m intermediate 6D poses corresponding to the sliding window is input to the deep neural network, and
the pose prediction model outputs the relative 6D pose corresponding to each window at the IMU rate.

16. The AR device of claim 13, wherein the processor is further configured to update and set the estimated intermediate 6D pose to a ground truth (GT) pose at a real time point when an image is photographed, based on estimation on the intermediate 6D pose by the VI-SLAM module being completed.

17. The AR device of claim 16, wherein the pose prediction model performs the learning using the deep neural network via a self-supervised method based on updating of the GT pose.

18. The AR device of claim 13, wherein the pose prediction model performs the learning using the deep neural network with multi-rate inputs including the IMU values at the IMU rate of the first frequency and the intermediate 6D pose at the frame rate of the second frequency, and
the first frequency is greater than the second frequency.

19. The AR device of claim 13, wherein the deep neural network comprises a recurrent neural network using a long short term memory or a gated recurrent unit.

20. The AR device of claim 19, wherein the deep neural network performs back propagation through time by reducing a loss function using an updated GT pose.

21. The AR device of claim 13, wherein the processor is further configured to output a result of inference of predicting relative 6D poses in real time through processing by the learned deep neural network of the pose prediction model, when newly obtained IMU values and newly estimated intermediate 6D poses according to the movement of the AR device are input to the learned deep neural network of the pose prediction model.

22. A method of predicting a pose in a processor, the method comprising:
obtaining, by using an inertial measurement unit (IMU) sensor provided in an augmented reality (AR) device, IMU values corresponding to a movement of the AR device at an IMU rate of a first frequency;
obtaining intermediate 6-degrees of freedom (6D) poses of the AR device estimated based on the obtained IMU values and images surrounding the AR device, the images being obtained at a frame rate of a second frequency using a camera provided in the AR device;
generating a pose prediction model for predicting relative 6D poses of the AR device; and
inputting the IMU values as a first input to the pose prediction model, and separately inputting the intermediate 6D poses, which are obtained prior to predicting the relative 6D, as a second input to the pose prediction model; and
outputting the relative 6D poses of the AR device by performing learning based on the obtained IMU values and the intermediate 6D poses using a deep neural network implemented by the pose prediction model.

\* \* \* \* \*